Dec. 26, 1944.  W. JOKEL  2,366,112
SELF-CLEANING FILTER
Filed Nov. 21, 1941
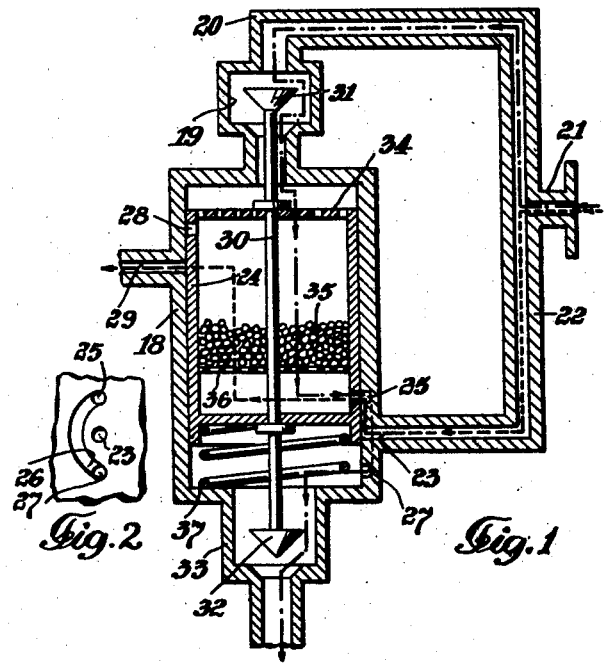
INVENTOR:
William Jokel
BY
ATTORNEYS.

Patented Dec. 26, 1944

2,366,112

UNITED STATES PATENT OFFICE 2,366,112

SELF-CLEANING FILTER

William Jokel, Brooklyn, N. Y.

Application November 21, 1941, Serial No. 419,962

1 Claim. (Cl. 210—144)

My invention relates to filters and more especially to a self-cleaning filter adapted for automatic removal of impurities from liquids fed under pressure such as for instance a lubricant (oil) forced into the bearings of internal combustion and other engines, car wheels etc.

It is an object of my invention to provide a self-cleaning filter of particularly simple and rugged design, consisting only of a few parts and capable of functioning automatically for an indefinite period of time.

In the drawing affixed to this specification and forming part thereof an embodiment of my new filter is illustrated diagrammatically by way of example.

In the drawing:

Fig. 1 is a vertical axial section of my new filter, and

Fig. 2 shows a detail.

Referring to the drawing, 22 is the inlet pipe and 2 the outlet pipe of a filtering device according to this invention inserted in a liquid supply pipe of a forced feed lubricating system or the like. 18 is a filter casing inserted between the inlet and outlet and 24 is a hollow piston fitting in the casing 18 for free axial movement, while 37 is a coil spring inserted between the casing bottom and the bottom of the hollow piston. 36 is a strainer in the piston, formed by wire netting, perforated sheet metal or the like, which carries the filtering material 35, preferably consisting of small globules of a light metal, plastic or other light weight material, and 34 is the perforated cover of the hollow piston 24, which thus constitutes a vessel with a perforated cover.

The casing 18 receives its normal oil supply through an intake valve 19 connected through a branch pipe 20 with the main oil supply pipe 21. Another branch pipe 22 leads from the main supply pipe to a port 23 near the casing bottom. The piston 24 is formed near its bottom with a port 25 which, in the normal position of the piston, registers with the top end of a curved groove 26 in the casing wall which groove, extending downward and partly surrounding the port 23, ends near the casing bottom at 27 (Fig. 2). Another port 28 in the top part of the piston wall registers with the waste pipe 29 in the casing wall only while the piston is lowered into its extreme position. The piston by means of an axially extending rod 30 controls the intake valve body 31 and exhaust valve body 32 at the casing bottom, which valve bodies alternately open and shut off the intake valve 19 and exhaust valve 33.

In the operation of this device the liquid to be filtered, entering at 21, normally flows through branch pipe 20, the open valve 19 and the perforated top 34 into the top part of piston 24 and after passing through the layer of 35 of filtering material escapes through the perforated bottom 36, exhaust port 25, curved groove 26 and exhaust valve 33.

When the filter is clogged and the pressure in the casing rises accordingly, the piston 24 being lowered against the action of the spring 37 shifts its exhaust port 25 into register with the opening 23 of branch pipe 22, at the same time bringing the port 28 into register with the waste pipe 29, while valve body 31 shuts off the flow of liquid through branch pipe 20 and valve body 32 closes the exhaust. The uncleaned oil now enters the bottom part of the piston and passes from below through the perforated bottom 36 and the filtering material 35 and port 28 into the waste pipe. The reversal of the flow of the liquid causes the layer of filtering material to be loosened by lifting the filtering bodies and the impurities in the filter to be carried away. As soon as the filter has become permeable again for the normal flow, the spring 37 is able to lift the piston 24 into its normal position, thereby also opening the valves 19 and 33, while shutting off connection between the branch pipe 22 and the interior of the piston and restoring communication between the bottom part of the piston and of the casing.

I wish it to be understood that I do not desire to be limited to the exact details of construction shown and described, since obvious modifications will occur to a person skilled in the art.

I claim:

In a filtering device in combination, a casing to be inserted in a liquid circulation, said casing being formed with a main liquid intake port and a main liquid exhaust port, a liquid supply conduit connected with said main intake port, a hollow piston arranged in said casing for reciprocating movement between said main intake port and said main exhaust port, a strainer extending across the cavity in said piston, a body of loose filtering material located on the side of said strainer facing said main intake port, resilient means arranged to act on said piston in axial direction, means controlled by said piston for alternately shutting off and reestablishing the flow of liquid through said main intake and exhaust ports, two auxiliary ports in the casing wall on different sides of the strainer plane and two auxiliary ports in the piston wall, each auxiliary piston port being axially aligned with and so spaced from an auxiliary casing port, that in one end position of the piston only one auxiliary piston port registers with the corresponding auxiliary casing port, and an auxiliary liquid supply conduit connected with the auxiliary casing port arranged on the same side of the strainer plane as said main liquid exhaust port.

WILLIAM JOKEL.